May 28, 1957 R. W. HUGHES ET AL 2,794,071
POWER LINE FAULT LOCATOR
Filed Oct. 20, 1951 4 Sheets-Sheet 3

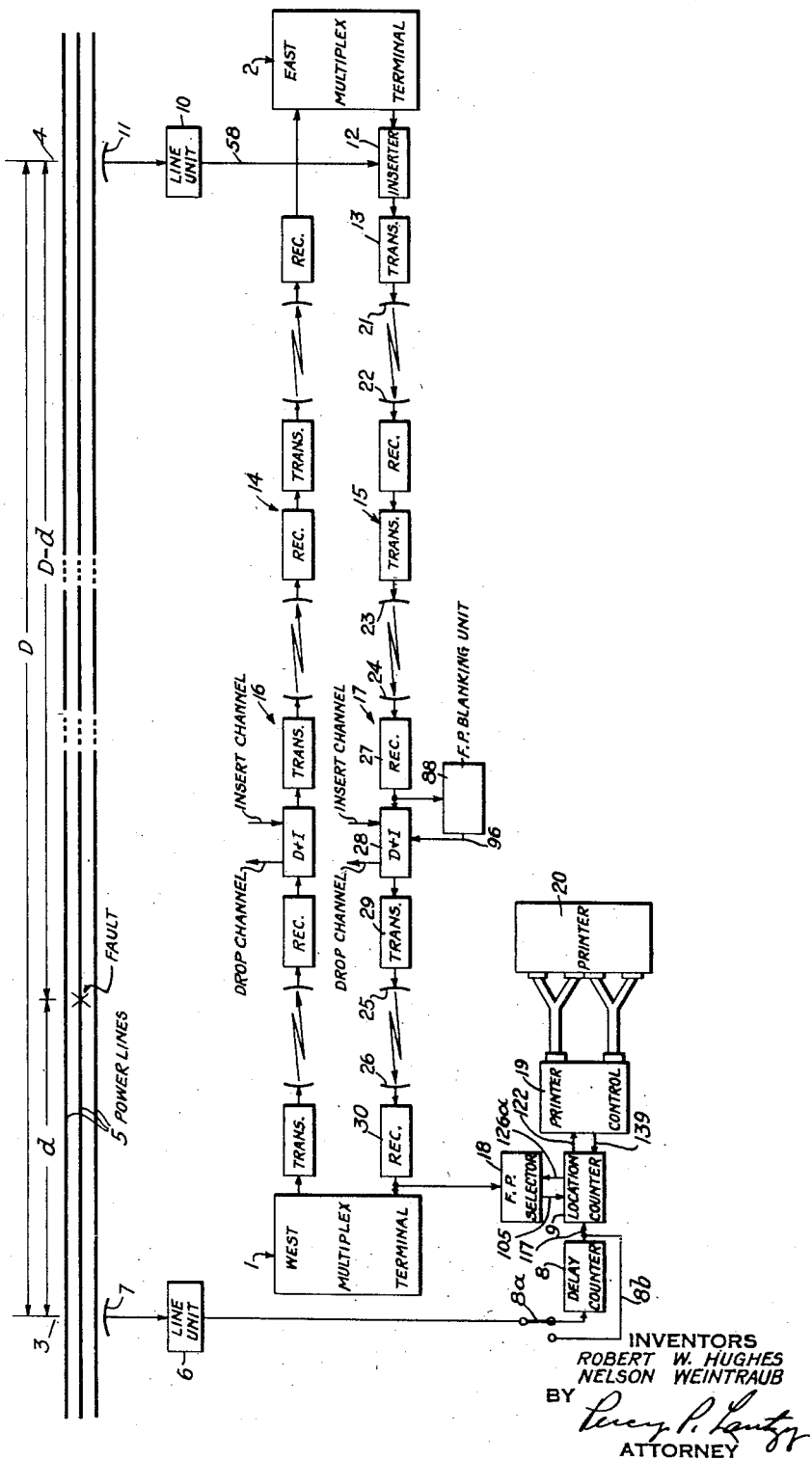

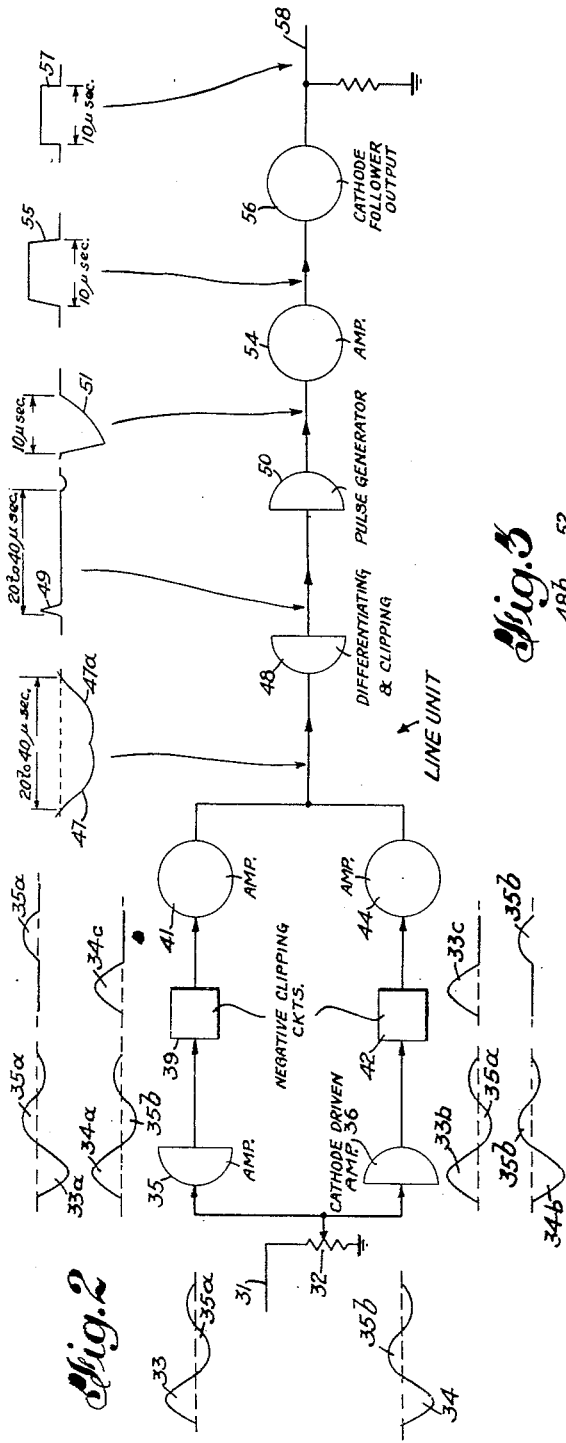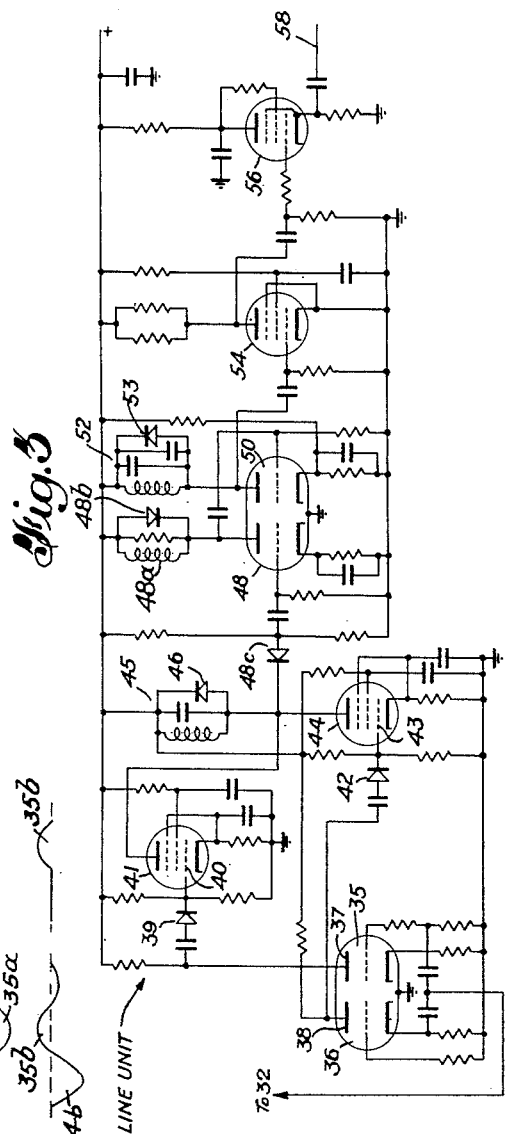

INVENTORS
ROBERT W. HUGHES
NELSON WEINTRAUB
BY
*Percy P. Lantzy*
ATTORNEY

May 28, 1957  R. W. HUGHES ET AL  2,794,071
POWER LINE FAULT LOCATOR
Filed Oct. 20, 1951  4 Sheets-Sheet 4
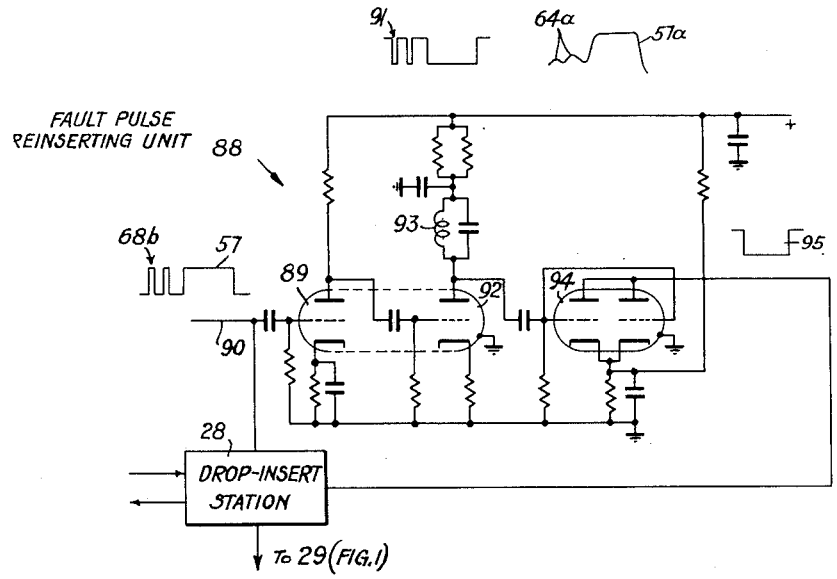
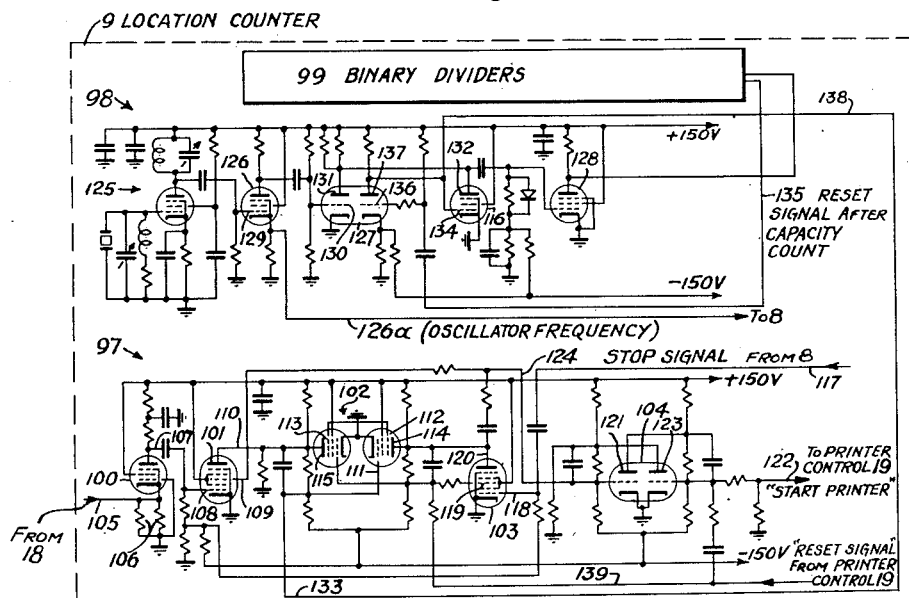
INVENTORS
ROBERT W. HUGHES
NELSON WEINTRAUB
BY
ATTORNEY United States Patent Office 2,794,071
Patented May 28, 1957

2,794,071

POWER LINE FAULT LOCATOR

Robert W. Hughes, Mountain Lakes, and Nelson Weintraub, Irvington, N. J., assignors to International Telephone and Telegraph Corporation, a corporation of Maryland Application October 20, 1951, Serial No. 252,392

16 Claims. (Cl. 179—15)

This invention relates to fault locator systems for power lines and more particularly to a fault locator system utilizing a telephone communication system as a part thereof.

The locating of faults on a power line has long plagued the power industry. It is particularly troublesome since approximately 90 percent of all faults are not sustained and hence the location of such faults must be determined on an instantaneous basis. The location of such faults in power lines on an instantaneous basis may be obtained by providing means at two selected points for detecting transient fault surges traveling along the line between those points. For example, when a power line fault occurs, a transient surge travels along the line in both directions from the fault. By detecting the transient fault surge at each of the two points and by transmitting signals in response thereto to a time measuring device, an elapsed time relationship between the reception of the two surge signals can be measured giving the location of the fault along the line.

One of the objects of this invention is to provide a fault locating system for power lines wherein the fault signal can be applied to the signal wave of a multiplex communication system, either of the sub-frequency carrier or pulse type, for transmission to an interval measuring device without any perceptible interruption to voice communications over any of the communicating channels of the system.

Among other objects and features of the invention is the provision of fault surge detection means whereby fault transient surges of various forms, varying widely in amplitude and/or voltage rise time and either of positive or negative polarity, are detected and converted into a signal of a distinctive characteristic for application to a signal wave of a telephone or radio telephone transmission system with negligible or no perceptible interference to the telephone channel or channels which such pulse might overlap. This characteristic signal in its preferred form is a pulse of about ten microseconds duration. Where this fault pulse is applied to a multiplex system, also employing pulses, the fault pulse is distinctive because of its greater duration. The fault pulse, of course, may be otherwise characterized, either in amplitude or by pulse code.

Another feature is the provision of means for inserting a random but distinctive signal pulse into a multiplex system for transmission along with the multiplex signal wave without loss or serious distortion to the shape of such pulse. The distinctive pulse is inserted by substituting the fault pulse for any channel pulses that may coincide therewith. If desired, a signal pulse may be applied by blanking out a given portion of the signal wave, in which case the blank interval in the wave train may constitute the fault signal, or a signal pulse representing the fault pulse may be provided in the blanked interval.

Still another feature is the use of the trailing edge of the distinctive pulse as the fault signal for operation of the measuring apparatus. This feature is made use of in passing repeater terminals where communication channels are dropped from and inserted into the multiplex signal wave. The repeater feature of the invention is the provision of a circuit for first detecting the distinctive pulse and then blanking out any insertion pulse that might coincide with the distinctive fault signal thus preserving the shape and time position of the distinctive signal, particularly with respect to the trailing edge portion thereof. As an alternative to the blanking operation, a fault pulse detector and reinserter may be used whereby the fault pulse is caused to by-pass certain repeater or terminal apparatus wherein it might otherwise become distorted or lost.

Another feature of the invention is the transmission of any pulse of random occurrence over a multiplex communication system which uses either sub-frequencies or pulses for intelligence modulation of the radio frequency carrier without apparent or perceptible interference to the multiplex wave.

The above-mentioned and other features and objects of this invention and the manner of attaining them will become more apparent by reference to the following description taken in conjunction with the accompanying drawings, wherein:

Fig. 1 is a schematic block diagram of the fault locating system for power lines showing a pulse multiplex radio telephone communication system part of which is utilized in the fault locator system in accordance with the principles of this invention;

Fig. 2 is a block diagram together with curves useful in describing the line unit of the system wherein transient fault surges detected on the power line are translated into a pulse of a given distinctive characteristic;

Fig. 3 is a schematic circuit diagram of the line unit as shown in block diagram of Fig. 2;

Fig. 6 is a schematic circuit diagram of the fault pulse blanking unit employed at certain repeater terminals in a multiplex communication system, wherein channels are dropped and other channels are inserted in the multiplex signal wave; and Fig. 7 is a schematic circuit diagram of the location counter by which the distance to the fault is measured.

Figure 4:
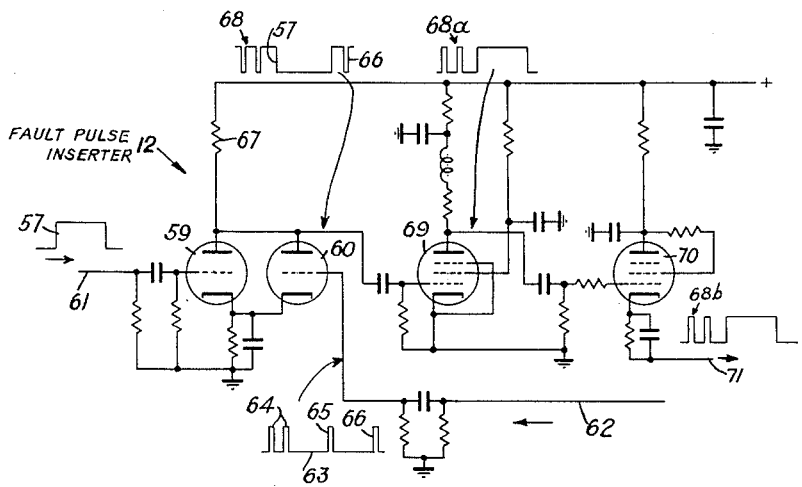
Fig. 4 is a schematic circuit diagram of the circuit for applying the distinctive fault pulses to the signal wave train of the multiplex communication system.

Referring to Fig. 1 of the drawing, a pulse multiplex radio telephone communication system is shown having a west terminal 1 and an east terminal 2 located near points 3 and 4 of a power line 5. The distance D of the line between the points 3 and 4 is the length of line to be monitored for the occurrence of faults. The fault locating system of this invention is shown to include in conjunction with the multiplex system a line unit 6 having a capacitive coupling element 7 located adjacent the line 5 at point 3 whereby transient surges traveling along the line 5 can be detected. The line unit 6 preferably detects the fault transient regardless of form, shape and polarity and generates a fault signal of certain distinctive characteristics and applies it to a delay or signal storage device 8. This device delays transmission of the fault signal from line unit 6 for a time interval equal substantially to the time required for a pulse to travel a complete circuit including the length D of the power line 5 and the transit time from terminal 2 to terminal 1. The delayed signal is then transmitted to an elapsed time measuring counting device 9.

The line unit 10 adjacent point 4 is preferably made identical to the line unit 6 although it need not be. The function of the line unit 10 is to detect fault transients the same as the unit 6 and to generate a distinctive fault signal for transmission through the multiplex system. The output of the line unit is applied to a mixer 12 coupled to the transmitter 13 of the terminal 2 wherein the fault signal pulse is super-imposed on the signal wave train transmitted from the terminal.

The multiplex communication system may be any telephone communication system, either wire, cable or radio, and the multiplex feature may be based on sub-frequency carriers or a form of pulse modulation. As shown the two terminals 1 and 2 adjacent the points 3 and 4 have two paths of communication therebetween, one from west to east, and the other from east to west. These paths, depending on the distance between terminals, may each include one or more repeater or relay stations. As shown in Fig. 1, by way of illustration, the transmission paths include two repeater stations 14 and 15, and two channel drop and insertion stations 16 and 17. The fault signal is transmitted through or about certain of the equipment of the repeater or relay station in a manner to preserve the pulse shape, particularly the trailing edge portion of the signal pulse and the time position thereof. At the west terminal 1, the fault pulse signal is detected and separated at 18 from the multiplex signal wave and applied to the elapsed time measuring device 9.

The function of the device 9 is to count the elapsed time between application thereto of two successive pulses in predetermined increments, such as, for example, 0.672 microsecond which corresponds to $\frac{1}{16}$ mile, and to present this information to a printer control unit 19. The device 9 preferably has capacity to store a second succeeding count while the first one is being printed. The measuring device thus indicates through the printer control when the printer 20 may begin printing a record of the fault signal which, for example, may indicate the distance from the recorder to the fault within a tenth of a mile, the month, day, hour, minute, and second. A printed record (107.4 Sept. 15 3 58 01 PM), for example states that the fault is 107.4 miles down the line and that it occurred during September, the 15th day, third hour, 58th minute and 01 second, PM. The printer in turn sends back to the measuring device an acknowledgment signal by way of the printer control unit 0.1 second after initiation of a printing operation. This acknowledgment signal conditions the measuring device to accept a second fault pulse count for storage.

For a better understanding of the measuring operation of the system the occurrence of a fault will be described in connection with a fault at $x$ in Fig. 1. When the fault occurs at $x$, a transient surge will travel in opposite directions along the power line 5. The time required for a surge to travel from point 3 to point 4 on the power line will be indicated as D. The time required for a fault pulse to be transmitted from terminal 2 to terminal 1 will be $D_R$. $D_R$ will be several microseconds longer than D because of the circuitry through which the pulse must pass, assuming that the physical length of the power line and the communication link are substantially identical. The time for a transient surge to flow from point $x$ to point 3 may be taken to the "$d$" microseconds. The transient surge from point $x$ to point 4 on the power line and then through the multiplex communication link to terminal 1 will be $[D-d]+D_R$ microseconds. The fault pulse generated at line unit 6 in response to a transient surge is fed to the device 8 adjusted to delay the signal by an amount equal to $D+D_R$ microseconds. The delayed output then is a pulse which occurs $d+D+D_R$ microseconds after the occurrence of the fault. The fault pulse arriving from terminal 2, at the end of $[D-d]+D_R$ microseconds is applied to the measuring device 9 first thus initiating operation of the time measurement. The delayed fault pulse from device 8 is utilized to terminate the measuring operation. The two pulses entering the device 9 occur in the following order: The one by way of line unit 10 and the multiplex communication system a time interval equal to $[D-d]+D_R$ microseconds after the fault occurrence, and the other by way of line unit 6 and delay device 8, a time interval equal to $d+D+D_R$ microseconds. The device 9 thus measures the time interval between application of the two pulses to the device 9 which may be represented thus:

$$(D+D_R+d)-(D+D_R-d)=2d=$$

twice the time it takes a pulse to travel from the fault point $x$ to the device 8.

The measuring device 9 converts the $2d$ microseconds into miles in the following manner: When the first of the two pulses to be timed enters the device, it begins to count cycles of a crystal controlled oscillator, one cycle at a time. When the second of the two pulses enters the counter it stops counting cycles. The number of cycles indicated, therefore, is proportional to the time between the start and stop pulses. Where the period of the oscillator frequency is the correct length of time, the time can be converted to miles by making use of the fact that it takes $\frac{1}{186,000}$ seconds for a pulse to travel one mile. This propagation rate is substantially the same for both the power line and the radio path and may be taken as 5.376 microseconds per mile, or .672 microsecond per $\frac{1}{8}$ mile. Assuming that .672 microsecond is the period of oscillation frequency of the device 9, then each such increment corresponds to $\frac{1}{8}$ mile. It will be recalled, however, that the two pulses are spaced by "$2d$" microseconds and the distance desired is only "$d$." The measuring device is, therefore, adjusted to count sixteen of these increments before it indicates one mile. This represents $\frac{1}{16}$ mile for every incremental separation of the pulses or .672 microsecond.

As an example:

1. Suppose a fault occurs at 1 mile from point 3.
2. It takes a pulse 5,376 microseconds to travel one mile; therefore "$d$" is 5.376 microseconds.
3. "$2d$" which device 9 measures=10.752 microseconds.
4. In increments of .672 microsecond, this is $$\frac{10.752}{.672}=16 \text{ increments}$$

or $\frac{16}{16}$ of a mile or 1 mile.

Hence the measuring device by virtue of its power to divide by two, gives the system an accuracy up to $\frac{1}{16}$ of a mile.

The arrangement of the delay counter and location counting or measuring device 9 described above provides a measurement from the device 3 to the fault. By omitting the delay counter and dividing the measurement of time between reception of the two fault pulses, a distance measurement is obtained for the distance between point 4 and the fault. Such omission of the counter 8 is indicated in Fig. 1 by way of switch 8a and by-pass connection 8b.

*Multiplex telephone radio communication system*

Before describing in detail the circuitry for the fault locator equipment, one example of a multiplex telephone radio communication system will be briefly described. At each terminal 1 and 2, means are provided for combining a number of separate voice frequency channels into a time modulated pulse train. A periodic marking or synchronizing signal is provided and the signal pulses of the several voice channels are sandwiched in serial order between successive marker signals. The signal intelligence of each channel is conveyed by time modulating the pulses of the channel with regard to their time occurrence with respect to the marker signals. The terminals also include means for separating the pulses of the several channels and for demodulating the signals, thus restoring the original audio signal of each channel for delivery to a wire line. For multichannel transmission between terminals the multiplex time modulated pulse train keys an R.-F. carrier. At certain repeater or relay stations it is desirable to separate or "drop" one or more channels from the multiplex pulse train and to insert other channels into the train. One such drop and insert station is indicated at 17.

The multiplex pulse time modulated signal train originating in the multiplex modulator equipment of terminal 2 is applied to the transmitter oscillator 13. The pulsed R.-F. signal is delivered to microwave antenna 21 whereby it is beamed to antenna 22 of repeater station 15 located from thirty to fifty miles from the antenna 21, depending on the terrain. The antennas employed may be any known form for beaming the carrier, a suitable form being a half-wave dipole mounted at the focal point of a parabolic reflector. The transmitter antenna 23 of station 15 is beamed to antenna 24 of relay station 17. The output antenna 25 of station 17 is beamed to the antenna 26 of terminal 1. In the adjacent path from west to east, a similar series of repeater or relay stations are employed, the number of repeater or relay stations depend on the distance between terminals and the terrain.

At the repeater station 15 the receiver and transmitter equipment is used to boost the amplitude of the received signals for re-transmission. At the station 17 the receiver 27 demodulates the multiplex signal wave to video form for channel separation and channel mixing at 28 whereby channels may be dropped and inserted. The resulting video pulse train modulates a second R. F. carrier at 29 for transmission from the station to terminal 1 where the receiver 30 converts the R. F. signal wave to I. F. which is amplified and demodulated to a pulse video train. The terminal 1 includes demodulator equipment and channel separating equipment to apply the several channels to corresponding telephone wires and the usual telephone switching equipment.

For more detailed information on various features of a pulse multiplex telephone radio communication system, reference may be had to the following U. S. patents, which disclose pulse multiplex systems, pulse modulators, pulse demodulators, and drop and insert channel systems.

E. Labin-D. D. Grieg, No. 2,429,631, October 28, 1947
D. D. Grieg, No. 2,445,775, July 27, 148
D.D . Grieg, No. 2,485,591, October 25, 1949
D. D. Grieg-A. M. Levine-S. Moskowitz, No. 2,490,801, December 13, 1949
D. D. Greig, No. 2,547,001, April 3, 1951

*Line unit*

In Figs. 2 and 3, a form of line unit is shown which may comprise the type employed at 6 and 10, Fig. 1. The input 31 to the line unit from coupling element 7 is applied thereto through a potentiometer 32. The line unit produces a distinctive pulse signal in response to detection of the occurrence of a transient surge along the power line regardless of any one or any combination of a number of transient surge conditions. The unit produces a positive pulse, which by way of example, may be 15 volts in amplitude and of about 10 microseconds duration, the rise and decay time being steep in the neighborhood of about 0.2 microsecond maximum and whose leading edge corresponds in time to the leading edge of the fault surge. The unit responds to pulse inputs from the power line regardless of variations as follows:

1. Input pulses of amplitude ranging from 0.05 volt to 70.0 volts.
2. Pulses either positive or negative polarity.
3. Pulses having a build-up time ranging from 1 to as much as 20 microseconds.
4. Any combination of the above three variations.

In addition, the line unit discriminates trailing fluctuations or "overshoots" at the end of transient surges. For example, when a surge enters it is the leading edge of the incident transient which controls the final measurement of the fault locator system. In order to preserve and define this edge until it passes through the line unit, no additional output will be obtained from the line unit for a period of approximately 20 microseconds following the incident leading edge. Any "overshoots" are thus ignored so that no ambiguity results in the output of the line unit. The potentiometer besides serving as a coupling unit also acts as a gain control.

The fault surge which may be represented by positive pulse 33 or negative pulse 34 is applied to amplifiers 35 and 36. The amplifier 35 is a normal class A amplifier and amplifies the input pulse either positive or negative, converting it to either negative pulse 33a or positive pulse 34a, as the case may be. Amplifier 36 is a cathode driven class A amplifier which amplifies the fault surge but does not invert the input signal, the output in response to pulse 33 and pulse 34 being represented by pulses 33b and 34b, respectively. The trailing fluctuations or "overshoots" are also passed by the parallel branch circuit as indicated at 35a and 35b but these trailing undulations are suppressed in the pulse shaping circuit. The signals at plates 37 and 38 of the two amplifiers, Fig. 3, are of opposite polarity for any one given input signal polarity. The output of amplifier 35 is fed through a negative clipping circuit 39, such as a crystal diode, to the control grid 40 of a tube 41. The output of the amplifier 36 is likewise fed through a negative clipper 42 to the control grid 43 of tube 44. The negative clipping circuits 39 and 42 allow only positive signals to reach the grids 40 and 43. If any overshoots, 35a or 35b, are present in the fault surge at the inputs of these clipper circuits only the positive ones are passed. As shown by the curves in Fig. 2, the input pulses 34a and 33b only are passed as indicated at 34c and 33c. The tubes 41 and 44 operate as class A amplifiers having a common plate circuit consisting of a tuned circuit 45 damped by a crystal diode 46. The positive pulse on either grid 40 or 43 results in a single negative pulse 47 of at least 20 microseconds duration. The overshoots only tend to lengthen the negative pulse, as indicated by the pulse 47a.

This composite negative pulse 47 is applied to the differentiating and clipping circuit of tube 48 which includes inductance 48a and rectifier 48b, Fig. 3, also diode 48c which insures only a negative pulse at the grid of tube 48 since diodes 39 and 42 will not do this at small signal levels. The differentiating action at 48 produces a single positive pulse 49 which enters tube section 50 which operates very close to cut-off and generates a ten microsecond negative pulse 51 in the plate tuned circuit 52. The crystal diode 53 insures only a negative pulse. This negative pulse 51 is applied to amplifier 54 which is normally conducting so as to produce on the plate of tube 54 a limited positive pulse 55 of ten microseconds duration. The output of tube 54 is applied to cathode follower amplifier 56 which further shapes the pulse as indicated at 57. The final pulse 57 obtained from the output 58 is the distinctive fault pulse which, on the one hand, is transmitted from line unit 6 to the delay counter 8, and on the other hand, from line unit 10 to the mixer 12 for transmission through the pulse multiplex system to the delay counter 8.

The circuitry of the "line unit" comprises the subject matter of the copending application of N. Weintraub, Serial No. 252,393, filed October 20, 1951, now Patent No. 2,717,992.

*Fault pulse inserter*

The fault pulse inserter 12, Fig. 1 and Fig. 4, functions to apply the fault pulses onto the multiplex pulse train of the multiplex communication system. The unit comprises two mixing stages 59 and 60 to which are applied the fault pulses over input connections 61 and 62, respectively. The fault pulse is indicated as a positive pulse 57 while the multiplex pulse train is indicated at 63 as comprising a marker signal 64 and successive channel pulses 65, 66, etc. The two stages 59 and 60 amplify the two inputs across a common plate load 67, the output being represented by inverted wave 68 wherein the fault pulse 57 has completely blanked out channel pulse 65. This mixed signal wave 68 is fed to amplifier 69 where the wave is inverted and amplified, as indicated at 68a. The stage 70 is connected to the output of tube 69 as a cathode follower whereby a positive output wave 68b is obtained of desired amplitude on the output connection 71.

Fault pulse selector

Figure 5:
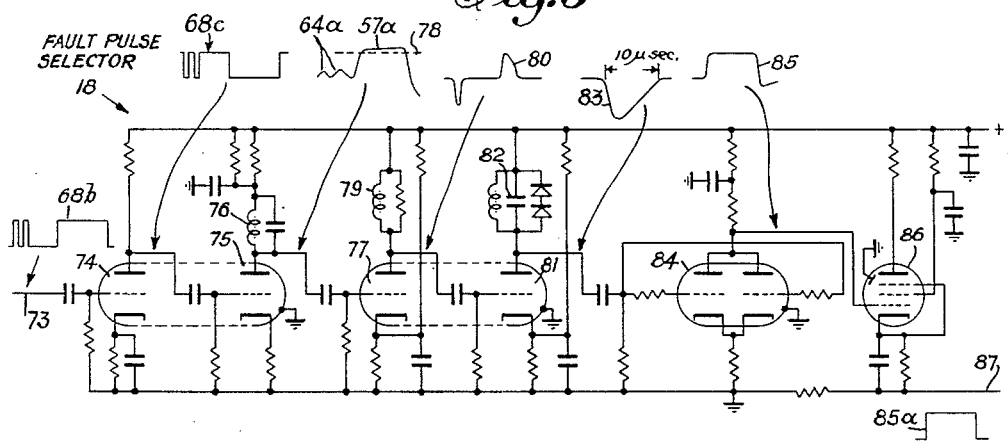
Fig. 5 is a schematic circuit diagram of the fault pulse demodulator, whereby the fault pulse is detected and separated from the multiplex signal wave.

The purpose of the fault pulse selector 18, Fig. 1 and Fig. 5, is to separate the fault pulse from the video pulse train appearing on the output of receiver 30, and to generate a new ten microsecond fault pulse starting from the trailing edge of the separated fault pulse. The output from the separator 18 is then applied to the location counter 9 in the circuit arrangement shown in Fig. 1. The video pulse train 68b is applied to the input 73 of amplifier 74 which inverts the pulse train having an output of a given negative voltage, as indicated at 68c, which is sufficient to drive to cut-off the following stage 75. The stage 75 is normally conducting and is driven to cut-off by the negative pulse train. The inductance 76 in the plate circuit of stage 75 integrates the signal so that the channel pulses and also the marker signal pulses produce small positive sawteeth of low voltage as indicated at 64a for the marker signal, while the fault pulse produces a signal of considerably greater voltage as indicated at 57a. The stage 77 is biased beyond cut-off to a point such as to block the marker and channel pulses but to pass the fault pulse 57a as indicated by the cut-off level 78. The inductance 79 in the plate circuit thereof differentiates the fault pulse thereby providing a positive pulse 80 which is coincident with the trailing edge of the fault pulse. The stage 81 is biased beyond cut-off so plate current flows only during the positive pulse 80 from the preceding stage. The capacity 82 of the plate circuit of stage 81 provides a large negative output pulse 83 which has a ten microseconds duration at the base thereof. The stage 84 is normally conducting but is cut-off by the microsecond negative pulse 83 from the preceding stage thereby resulting in a positive pulse 85 in the plate circuit thereof. The cathode follower 86 further shapes the positive pulse to produce an output pulse 85a of ten microseconds duration at the output connection 87.

Fault pulse blanking unit

The fault pulse blanking unit 88 shown in Fig. 6 insures passage of the fault pulse through the drop-insert apparatus of relay stations such as station 17, Fig. 1, to avoid distortion and loss due to interference with channel pulses inserted in the wave train in coincidence with the fault pulse. The function of the fault pulse blanking unit is to detect a fault pulse occurring at a random timing in a multiplex pulse train and to re-inert or re-establish the fault pulse should it be lost or distorted by a channel pulse. Referring to Fig. 1 along with Fig. 6, the video pulse train appearing at the output of the receiver 27 is applied both to the fault pulse blanking unit 88 and to the drop-insert circuit 28. The pulse train 68b is applied to the input stage 89 through input 90 whereby the pulse train is amplified and inverted, as indicated at 91, having an output negative voltage sufficient to cut-off the following stage 92. The stage 92 is normally conducting and is driven to cut-off by the negative pulse train 91. The inductance 93 in the plate circuit integrates the signal so that the channel pulses and the marker pulses are reduced to small voltage sawteeth, as indicated at 64a, while the fault pulse results in a large voltage pulse 57a, similarly as in the case of the demodulator circuit of Fig. 5. The succeeding stage 94 which is biased to cut-off prevents passage of the sawteeth 64a but allows passage of the pulse 57a thereby resulting in a negative rectangular pulse 95. The pulse 95 is nine microseconds in duration, one microsecond being lost in detection of the incoming fault pulse. The trailing edge of the pulse 95, however, coincides with the trailing edge of the input pulse 57. The output pulse 95 is applied over connection 96 to the channel drop and insert device 28. Should any insert pulse coincide with the negative fault pulse 95, such insert channel is blanked out thereby preserving in the pulse train the fault pulse for transmission through transmitter 29 to the next succeeding station. The blanking pulse 95 coincides with the fault pulse, particularly the last nine microsecond duration thereof, so as to remove any insert channel pulse that may have coincided with that portion of the fault pulse. Thus, the trailing edge of the fault pulse is preserved as well as $9/10$ of the pulse thereby insuring proper demodulation at fault pulse selector 18, Fig. 1. The ten microseconds of the fault pulse is deducted in the measuring or recording operations so that detection of the fault pulse at 18 produces a new pulse having a leading edge corresponding to the trailing edge of the transmitted fault pulse.

Delay or signal storage device

The delay device 8, Fig. 1, may be any known type of cyclic counter by which a signal pulse may be stored for a time interval equal to $D+D_R$. The binary divider circuit is the type used for this purpose, although other forms of counting chains may be employed. The delay device need only store a pulse signal for the desired time interval and then transmit a control signal to the measuring device 9.

Location counter

The location counter or measuring device 9 functions to count out the time interval between two successive pulses in increments of 0.672 microsecond which corresponds to $1/16$ mile, and to present this count to the printer control unit 19, which in turn controls the operation of printer 20. The counter 9 also has the capacity to store a second succeeding count while one is being printed. The stored count cannot be damaged in any way because of a special lock-out circuit in the counter 9. The printer also sends back to the counter 9 an "acknowledgment" signal 0.1 second after receipt of a "printing start" signal. Upon receipt of an "acknowledgment" signal, the counter 9 is reset to make a second count.

Where the counting device 9 receives only one pulse instead of two, the device will count out to its full capacity and thereupon reset itself and cause the printer to print the capacity figure thus indicating a false signal.

Referring to Fig. 7, the counting device 9 is shown to comprise a switch and lock-out circuit 97, an oscillator gate circuit 98 and a bank of counters 99. The switch and lock-out circuit determines when the counter is ready to receive a pair of pulses, it being capable of locking out input pulses if a count is being stored, it opens and closes a gate causing the counter to start and to stop counting in accordance with the two input signals, it causes the printer control unit to initiate a printing operation and it indicates when the printer control unit has removed the count information from the counting circuit. The oscillator gate circuit 98 contains a crystal controlled oscillator whose cycles are to be counted. This circuit also contains a gate which controls transmission of the oscillations thereby providing a discrete number of cycles to be counted. This circuit also controls the reset operation in response to the second of a pair of pulses or upon completion of a capacity count where only one pulse is received.

Referring particularly to the switch and lock-out circuit 97, the circuit is shown to comprise an input tube 100, a start tube 101, a flip-flop circuit 102, a switch stop tube 103 and a lock-out print initiating tube 104 which operates as a bi-stable flip-flop.

An input pulse over connection 105 from the fault pulse selector 18, Fig. 1, is applied to the cathode of the tube 100. The cathode resistors 106 provide a termination for the video pulse input. The input pulse, which is of a positive polarity, causes a positive pulse to appear on the plate circuit 107. The switch start tube 101 has two control grids 108 and 109. When the grid 109 is low, the grid 108 no longer controls and the tube goes toward cut-off. In normal standby condition, the grid 108 is the controlling grid. When this grid receives the positive pulse from plate circuit 107, it causes the tube 101 to generate a negative pulse on its plate circuit 110. This negative pulse is applied to the grid 111 in the second tube 112 of the flip-flop circuit. Since the flip-flop circuit has two stable operating conditions, one condition is for tube 113 to be cut-off while tube 112 is conducting and the second condition is for tube 113 to conduct while tube 112 is at cut-off. The first condition mentioned above is the normal standby condition.

The negative pulse applied to grid 111 causes the tubes 112, 113 to flip to the second of the above mentioned conditions, that is, with tube 112 at cut-off and tube 113 conducting. This process of flipping gives rise to a positive pulse on the plate circuit 114 of tube 112 and a negative pulse on the plate circuit 115 of tube 113. This negative pulse on the plate circuit 115 is coupled to a gate tube 116 which functions to open the gate thereby allowing the counter 99 to begin counting cycles of oscillator frequency.

The counter continues to count cycles until the second or "stop" pulse is received from the delay counter 8, Fig. 1, which enters over connection 117 to the grid 118 of tube 103. This tube operates exactly the same as the tube 101 having two control grids 118 and 119, the grid 118, however, controls. The positive stop pulse causes this tube to generate a negative pulse on the plate circuit 120 thereby resulting in the following:

1. It causes the flip-flop circuit 112, 113 to flop back to standby condition, the plate circuit 120 being coupled to the grid of tube 113. This results in a positive pulse on the plate circuit 115. This circuit being coupled to the gate tube 116 results in closing the gate thereby stopping the counting operation. The counter now possesses the elapsed time between the "start" and "stop" pulses.

2. The plate circuit 120 being also coupled to the grid of tube 104, which is of the double triode flip-flop type (12AU7), it causes the triode to flip, which results in the plate 121 which was conducting in the standby condition now to cut-off giving rise to a positive pulse. The plate circuit 121 is connected through connection 122 to the printer control unit 19, Fig. 1, thereby initiating a printing operation. The plate 123 of the second triode of the tube 104 which was cut-off in the standby condition now conducts giving rise to a negative pulse. This negative pulse is coupled back through connection 124 to the alternate control grid 109 of tube 101. Since the tube 104 is in stable condition, it holds the control grid 109 at a low voltage thereby preventing additional inputs from interfering with the count stored in the counter.

The oscillator gate circuit 98 includes a crystal controlled oscillator 125, a cathode follower amplifier 126, a double triode (12AU7) 127, gate tube 116 and a buffer amplifier 128. The crystal controlled oscillator 125 provides an oscillator frequency for application to the grid 129 of tube 126. The cathode follower output 126a of tube 126 is applied to the counter 8, Fig. 1, to supply the oscillator frequency for the delay counting operation. The plate circuit of tube 126 is applied to the grid 130 of the double triode 127. The plate 131 of this tube is in turn coupled to the plate 132 of tube 116. When the gate tube 116 is conducting it causes its plate voltage and also that of the first triode of tube 127 to drop to a low value. This results in the amplification of the first triode of tube 127 to be considerably reduced. The level of its output being thus reduced, the tube 128 cannot amplify the signal on its grid and, therefore, gives no output signal. This condition, whereby the gate tube 116 is conducting, allowing no oscillator frequency to pass through tube 128, is the normal standby one, and represents the location counter as not counting.

The gate tube 116 is controlled by the condition of the flip-flop circuit 112, 113. The tube 113 generates a negative pulse upon receipt of an input "start" pulse which is fed over connection 133 to the grid 134 of the gate tube. Application of this negative pulse cuts-off the gate tube 116 allowing its plate voltage and that plate voltage of circuit 131 to rise. This additional amplification obtained in this manner is sufficient to increase the output of tube 127 to a point where the tube 128 will amplify it and feed the clipped oscillator frequency in the form of pulses to the counter 99. This condition, therefore, represents the condition for a counting operation.

The second half of the tube 127 functions as a "single pulse" reset tube. It receives a negative pulse from the hundreds decade of the counter at the completion of a capacity count over connection 135 on grid 136 which is amplified and appears as a positive pulse in the plate circuit 137 thereby causing the gate tube 116 through connection to grid 134 to close thereby stopping the counting operation. In addition, the positive pulse on the plate circuit 137 reaches through connection 138, the flip-flop circuit 112, 113 causing it to flip from its standby condition. As previously stated, this flipping causes the tube 104 to effect a lock-out and to initiate a printing operation. An "acknowledgment" signal is sent back to the counter over connection 139 immediately after receipt of a "printing start" signal, whereby the counter is reset for a new counting operation.

Printer and printer control

The printer and printer control units 19, 20, Fig. 1, may be of any known make, the printer and printer control units of the Potter Instrument Co., Inc., of Flushing, N. Y., being satisfactory for this purpose.

While we have described above the principles of our invention in connection with specific apparatus, it is to be clearly understood that this description is made by way of example only and not as a limitation to the scope of our invention, as set forth in the objects thereof and in the accompanying claims.

We claim:

1. A system for determining the location of faults on a power line between two spaced points, comprising means at each of said points to detect passage of a transient surge due to the occurrence of a fault somewhere between said points, a time interval measuring device adapted to be initiated by one signal and stopped by a second signal, means responsive to the detected surge at one of said points to apply a fault signal to said device, an intelligence communication system linking the surge detection means at the other of said points to said device, means responsive to detection of a surge at said other point to apply a fault signal to said communication system for transmission to said device, and means to preserve said signal during transmission through said system even though it may coincide in time with other signals being transmitted in said system.

2. A system according to claim 1, wherein the time interval measuring device is located at said one point and the fault signal detected at said one point is applied to initiate the measuring operation of said device and the fault signal transmitted from said other point is applied to discontinue operation of said device.

3. A system according to claim 1, wherein the time interval measuring device is located at said one point and the fault detecting means at said one point includes a delay unit for delaying the fault signal detected at said one point by an amount equal to the time for a fault pulse to travel the complete loop from said one point along said power line to said second point and back through said communication system.

4. A system according to claim 1, wherein the communication system is a pulse multiplex system having a plurality of channels represented by trains of pulses interleaved together, and wherein the fault signal is a distinctive pulse having a characteristic different from the channel pulse.

5. A system according to claim 4, wherein the distinctive pulse is characterized by having a duration different from any of the pulses of the multiplex system.

6. A system according to claim 1, wherein the means responsive to detected surges includes a circuit responsive to transient surges of either a positive or negative polarity and which may vary widely in the steepness of the leading edge of the surge.

7. A system according to claim 6, wherein said circuit includes parallel branches, one responsive to pulses of a positive polarity and the other responsive to pulses of a negative polarity, each branch being adapted to produce an output pulse of a given polarity, and means to distinguish between the initial undulation of the transient and the trailing fluctuations that usually follow.

8. A system according to claim 1, wherein the communication system is a pulse multiplex system having a plurality of channels represented by trains of pulses interleaved together, and wherein the fault signal is a pulse having a duration greater than the duration of any of the channel pulses, and wherein the means for inserting said distinctive signal in the signal wave includes a circuit to blank out any channel pulse which may coincide therewith.

9. A system according to claim 1, further including a channel drop and insert relay station and means for preserving said fault signal against coincidence with an insert pulse on passing through the apparatus of said relay station.

10. A system according to claim 9, wherein the communication system is a pulse multiplex system having a plurality of channels represented by trains of pulses interleaved together and wherein said fault signal is a pulse of a duration greater than the duration of any of said channel pulses, and the means for preserving the distinctive fault pulse includes means for detecting the distinctive pulse prior to passage of the signal wave through at least certain of the apparatus of said station and means for reinserting said distinctive pulse in said signal wave after passage through such apparatus.

11. A system according to claim 10, wherein the means for detecting the distinctive pulse includes means for producing a blanking pulse of substantially the same duration and timing as said distinctive pulse and the means for reinserting includes means utilizing said blanking pulse to remove any fault pulse distortion that may have occurred thereto in passage through apparatus of said station.

12. In a multiplex pulse communication system having a channel drop and insert station and means for transmission in the train of channel pulses randomly occurring pulses having random time relation to the channel pulses of said train of channel pulses, said random pulses having a duration greater than the duration of any of the channel pulses; means included in said station responsive to the duration of said random pulses to detect the presence of said random pulses in said train of channel pulses and means responsive to any such detection for blanking channel insert pulses that coincide in time with a given portion of said random pulses.

13. In a multiplex pulse communication system according to claim 12, wherein said means responsive to detection of a random pulse includes means for producing a blanking pulse of greater duration than any channel pulse duration timed to blank any channel insert pulse that coincides in time with the trailing end portion of said random pulse.

14. In a multiplex communication system having means for transmitting a plurality of channels of communication, the signal waves of each of said channels being time interleaved to form a signal wave train repetitious at a given rate, each of said channels occupying a given time interval in said train, means for transmitting random signals along with the signal wave of said channels comprising a means for inserting said random signals into said train randomly related to the timed occurrence of said channels and means for removing those portions of said channel signals that coincide with said random signals, said communication system including a drop and insert relay station having means responsive to said random signals in said signal wave train to blank any insert channel signals that coincide in time with said random signals.

15. In a multiplex communication system having means for transmitting a plurality of channels of communication, the signal waves of each of said channels being time interleaved to form a signal wave train repetitious at a given rate, each of said channels occupying a given time interval in said train, means for transmitting random signals along with the signal wave of said channels comprising a means responsive to said random signals for inserting corresponding random pulse signals into said train randomly related to the timed occurrence of said channels, each of said random pulse signals having a duration greater than at least one of said given time intervals, and means responsive to the output of said means for inserting and the signals waves of said channels for removing those portions of any channel signals that coincide with said random pulse signals.

16. A system according to claim 15, wherein said means for removing includes means responsive to the duration of said random pulse signals to blank those channel signal waves that coincide in time with said random signal pulse.

References Cited in the file of this patent

UNITED STATES PATENTS

| | | |
|---|---|---|
| 2,381,847 | Ullrich | Aug. 7, 1945 |
| 2,429,613 | Deloraine et al. | Oct. 28, 1947 |
| 2,438,902 | Deloraine | Apr. 6, 1948 |
| 2,468,058 | Greig | Apr. 26, 1949 |
| 2,510,273 | Barstow et al. | June 6, 1950 |
| 2,530,957 | Gilman | Nov. 21, 1950 |
| 2,535,446 | Mitchell | Dec. 26, 1950 |
| 2,547,001 | Greig | Apr. 3, 1951 |
| 2,628,267 | Stringfield | Feb. 10, 1953 |